United States Patent [19]
Gedeon

[11] 4,030,097
[45] June 14, 1977

[54] MUZZLE VELOCITY CHRONOGRAPH

[76] Inventor: Anthony A. Gedeon, 508 Hull Ave., Lewisburg, Tenn. 37091

[22] Filed: Feb. 2, 1976

[21] Appl. No.: 654,246

[52] U.S. Cl. .................................. 343/8; 73/167
[51] Int. Cl.² ........................................ G01S 9/44
[58] Field of Search ........................ 343/8; 73/167

[56] References Cited
UNITED STATES PATENTS

| | | | |
|---|---|---|---|
| 2,691,761 | 10/1954 | Smith, Jr. | 73/167 |
| 3,358,504 | 12/1967 | Freebairn | 73/167 |
| 3,918,061 | 11/1975 | Elgaard | 343/8 |

Primary Examiner—Maynard R. Wilbur
Assistant Examiner—Richard E. Berger
Attorney, Agent, or Firm—Thomas N. Young

[57] ABSTRACT

A chronograph uses a Doppler radar technique to determine the muzzle velocity of a bullet discharged from small arms such as pistols and rifles. A radar unit is placed in near proximity to the firearm to track the bullet while it is still relatively close to the muzzle. The radar unit is equipped with an antenna which is insulated from the sonic disturbance created by the firearm blast by sonic damping means formed exteriorly on the antenna. Measured spacing and orientation of the antenna with respect to the firearm diminishes the sensitivity of the antenna to the electromagnetic disturbance associated with the firearm blast. Doppler signal processing means are also disclosed.

13 Claims, 4 Drawing Figures

MUZZLE VELOCITY CHRONOGRAPH

INTRODUCTION

This invention relates to muzzle velocity chronographs and more particularly to a chronograph employing Doppler radar techniques.

BACKGROUND OF THE INVENTION

A chronograph is used by target shooters and others to measure the velocity of a bullet as it is discharged from the muzzle of a firearm. Muzzle velocity is deemed an important criterion in the shooting art and is taken into account when aiming or sighting the firearm as well as when loading and/or selecting ammunition. Since muzzle velocity is subject to the many vagaries of each particular firearm and ammunition load, it is beneficial to the shooter to have means for making a rapid and accurate determination of muzzle velocity in the field for each shooting situation.

Modern chronographs commonly employ a Doppler radar technique to determine muzzle velocity; as evidenced by Storm, U.S. Pat. No. 2,524,610. Basically, they sample the bullet velocity along a portion of its trajectory and extrapolate in reverse to make a calculated estimate of the bullet's velocity at the muzzle. Naturally, the closer to the muzzle the velocity sampling is taken the less likely the velocity will have been influenced by extraneous error factors. However, the ability of prior art chronographs to get a sampling in near proximity to the muzzle has been limited by the following factors.

Chronographs which employ radar techniques are under the jurisdiction of the Federal Communications Commission and are classified as "Field Disturbance Sensors". These devices are severely limited in their power output by 47 Code of Federal Regulations, Part 15, Subpart F.

If a conventional radar-type chronograph is placed in near proximity to the muzzle where it can obtain a reading of true muzzle velocity, its low power output will result in a return signal that is masked by the noise caused by the sonic and electromagnetic disturbances associated with the firearm blast. The sonic disturbance will cause vibratory excursions of the radar antenna that distort the return signal, and the electromagnetic disturbance will obscure the return signal in noise. Thus prior art chronographs have of necessity sampled the bullet velocity downrange from the muzzle, but only after spurious influences on the bullet velocity have been introduced.

The foregoing reasons explain the limitations of the chronograph measurement art to date and define a problem whose solution is an objective of the present invention.

SUMMARY OF THE INVENTION

The present invention is a chronograph which employs a Doppler radar technique to get a sampling of bullet velocity in near proximity to the muzzle and that observes all authoritative limitations on its output power.

Basically, this is accomplished by desensitizing the radar antenna to the sonic and electromagnetic disturbances created by the firearm blast. More specifically, the radar antenna is exteriorly covered with sonic damping material to drive down its resonant mechanical frequency into a range that can be filtered out without affecting the doppler signal and diminish vibratory excursions which distort the transmitted and received radar signals in the frequency range of interest. Measured spacing and orientation of the radar antenna causes the antenna to project a radar pattern that avoids a substantial amount of the electromagnetic noise created by the rifle blast. These provisions allow the chronograph to operate in near proximity to the firearm muzzle for a highly accurate determination of muzzle velocity.

In the preferred form of the invention, the chronograph has a horn-type antenna that is exteriorly covered with a layer of silastic, polyurethane, or foam rubber or a layered combination. In addition, an electromagnetic lens may be used to focus the radar pattern projected by the antenna.

Additional features, modifications and advantages will be made apparent in the following detailed description of a specific embodiment.

DETAILED DESCRIPTION OF THE SPECIFIC EMBODIMENT

Figures 1, 2, 3:
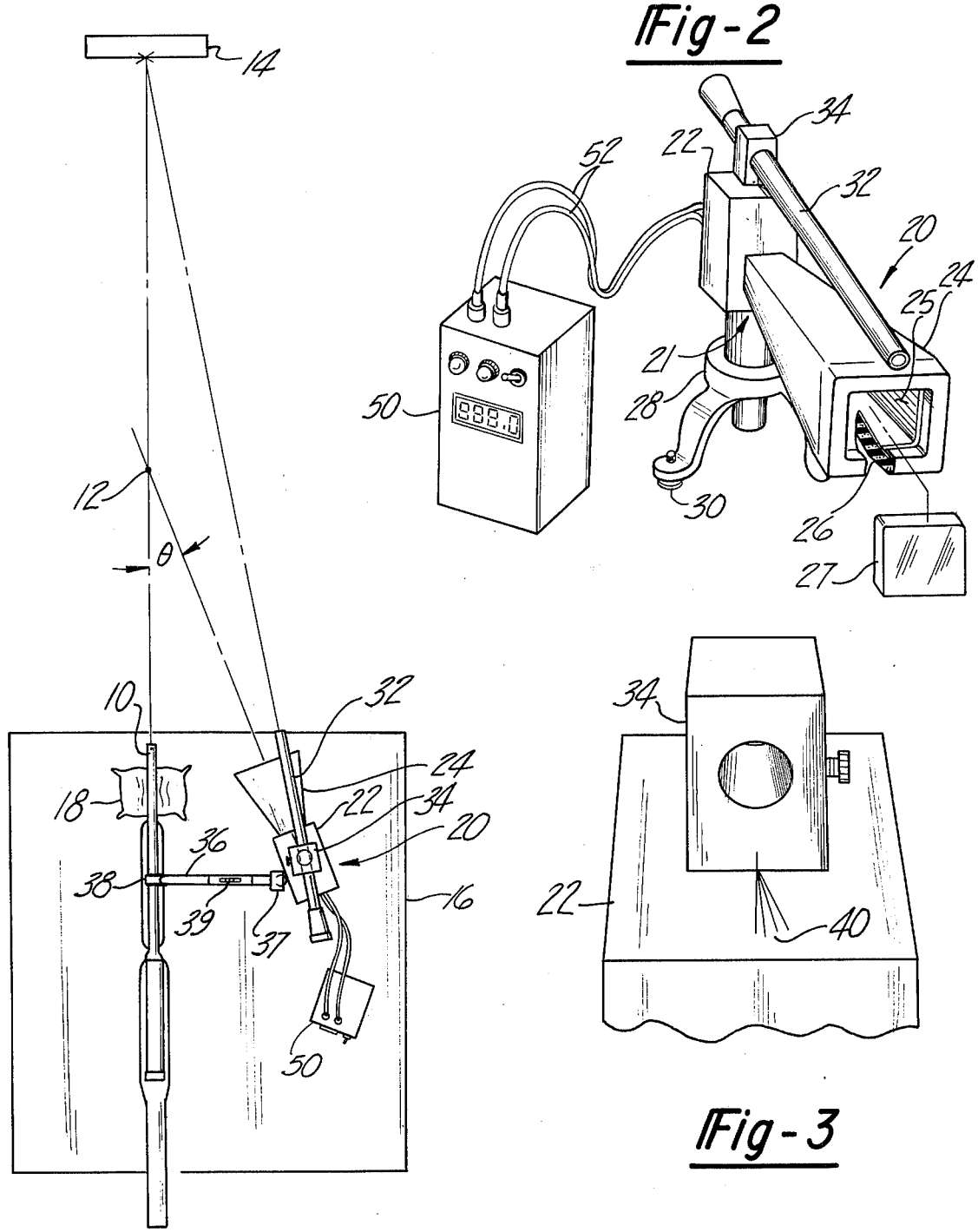
FIG. 1 is an environmental view of a chronograph embodying the present invention.
FIG. 2 is a perspective view of the chronograph of FIG. 1, partially in section, to illustrate the sonic damping material on the radar antenna.
FIG. 3 is an enlarged view of the pivotally adjustable scope mount.

In FIG. 1, a rifle 10 is shown firing a bullet 12 at a downrange target 14. Rifle 10 rests on a shooting bench 16, and is stabilized in shooting position by a sandbag 18.

A chronograph generally indicated at 20, embodying the present invention is set up on shooting bench 16 in predetermined spaced relation of rifle 10 to measure the velocity of bullet 12 for a determination of its muzzle velocity.

Chronograph 20 uses Doppler radar techniques to measure the velocity of bullet 12. With this method, a transmitted signal at a frequency $f_1$ is projected out in a pattern that illuminates a portion of the bullet's trajectory. As bullet 12 passes through the pattern it reflects back a signal at a frequency $f_2$. The difference between the transmitted frequency $f_1$ and the reflected frequency $f_2$, designated the Doppler frequency, $f_d$, is proportional to the velocity of the bullet. The well-known equation expressing this relationship is:

$$v = (f_d/f_1) \cdot (c/2)$$

where: $v$ = the velocity of the bullet, $f_d$ = the Doppler frequency, $f_1$ = the frequency of the transmitted signal, and $c$ = the speed of light in the medium.

The chronograph 20 is more fully illustrated in FIG. 2. Broadly, it comprises a Doppler radar transceiver unit electrically coupled to a signal processing unit 50 through leads 52. Transceiver unit 21 more specifically includes conventional radar transmitting and receiving means housed within waveguide 22 and a horn-type electromagnetic (EM) wave antenna 24 which, for reasons to be hereinafter made apparent, is exteriorly covered with a layer of resilient material 26, preferably either foam, polyurethane, or silastic rubber, or a layered combination. An electromagnetic lens 27, made from a plastic material or a sonic barrier and protection cover formed of styrofoam, is shaped to be disposed over the frontal opening or aperture 25 of EM antenna 24. Lens 27 serves to refract the transmitted signal into a focused pattern in accordance with known radar techniques. Waveguide 22 and EM antenna 24 are supported by a tripodal standard 28 which is vertically adjustable by individual thumb screws 30 which engage a threaded hole in each leg of the standard. The EM antenna 24 is aimed by means of a scope 32 which is supported in a mounting unit 34 that, for reasons to be hereinafter discussed, is pivotally adjustable in the horizontal plane.

Signal processing unit 50 houses the electronics which translates an input signal at the Doppler frequency $f_d$ into a displayed output signal that directly corresponds to the muzzle velocity of bullet 10. The operation of signal processing unit 50 will be hereinafter discussed in detail.

Chronographs using a Doppler radar measurement technique are classified as Field Disturbance Sensors by the Federal Communications Commission. Their power outputs in the fundamental and harmonic frequencies are severly limited in 47 Code of Federal Regulations, Part 15, subpart F. This constraint requires that the Doppler radar unit 21 be positioned with measured precision on the shooting bench 16 to project a radar pattern that avoids as much of the electromagnetic disturbance associated with the rifle blast as possible, but which is close enough to rifle 10 to receive a reflected radar signal whose signal-to-noise ratio is sufficiently high to allow processing.

Accordingly, FIG. 1 shows Doppler radar unit 21 to be positioned approximately two inches behind and six inches lateral to the forward end of rifle 10. When scope 32 is sighted on the target, EM antenna 24 projects a radar pattern 18 to 25 inches forward of the rifle. This pattern effectively looks around about eighty percent of the electromagnetic disturbance associated with the rifle blast, yet is close enough to receive a reflected signal having a sufficiently high signal-to-noise ratio for processing. A spacer rod 36 which is about six inches long and which has its opposed ends connected to respective points on rifle 10 and Doppler radar unit 21 facilitates the proper lateral positioning of chronograph 20. Spacer rod 36 is connected to radar unit 21 by a conventional pivotal socket 37 and is connected to rifle 10 by a U-shaped terminal segment 38 that rests on the rifle barrel. Spacer rod 30 further includes a bubble 39 for leveling radar unit 21 with respect to rifle 10.

Although chronograph 20 is illustrated herein with a rifle, it is adaptable to all popular types of sporting firearms, including pistols and shotguns. However, for each different type of ammunition, scope 32 must be adjusted to compensate for the particular bullet size. This is because larger bullets are picked up sooner by the radar than smaller bullets, and for purposes of correcting the velocity measurement for the cosine of the angle $\theta$ between the range axis of the bullet trajectory and the axis of the radar pattern it is most convenient to assume that the bullet is picked-up by the radar at the same point in the pattern each time.

To adjust for different sized ammunition, the scope 32 is supported in a pivotally adjustable mounting unit 34, shown enlarged in FIG. 3. A scale 40 scribed onto the top surface of waveguide 22 has a gradation of each popular ammunition type. In a general application of the invention, the chronograph is calibrated as follows. All targets are assumed to be 100 yards, and the chronograph 20 is spaced with respect to the rifle 10 as hereinbefore described. The chronograph 20 is then oriented such that the line-of-sight of antenna 24 is at an angle of approximately 15° with respect to a line parallel to the path of bullet 12. The scope line-of-sight is then adjusted for various size bullets. For example, 22 caliber rifles require about three (3) degrees of adjustment; 30 caliber rifles require about two (2) degrees of adjustment; and a shotgun requires about one (1) degree of adjustment. The rule is simply that relatively large projectiles require relatively less difference between the scope line-of-sight and the effective centerline of the radar pattern.

When chronograph 20 is positioned next to rifle 10 in the manner illustrated in FIG. 1, it is within the influence area of the sonic disturbance associated with the rifle blast. Sonic waves striking an EM antenna can cause it to undergo vibratory excursions which will result in severe distortion of the transmitted and received radar signals.

The present invention meets this problem in the manner illustrated in FIG. 2. EM antenna 24 is exteriorly covered with a layer of resilient material 26 that drives down the resonant mechanical frequency of the antenna to between 0 and 10 Hz. This effectively insulates EM antenna 24 from the sonic effects of the rifle blast and minimizes any concomitant distortion of the radar signals.

Figure 4:
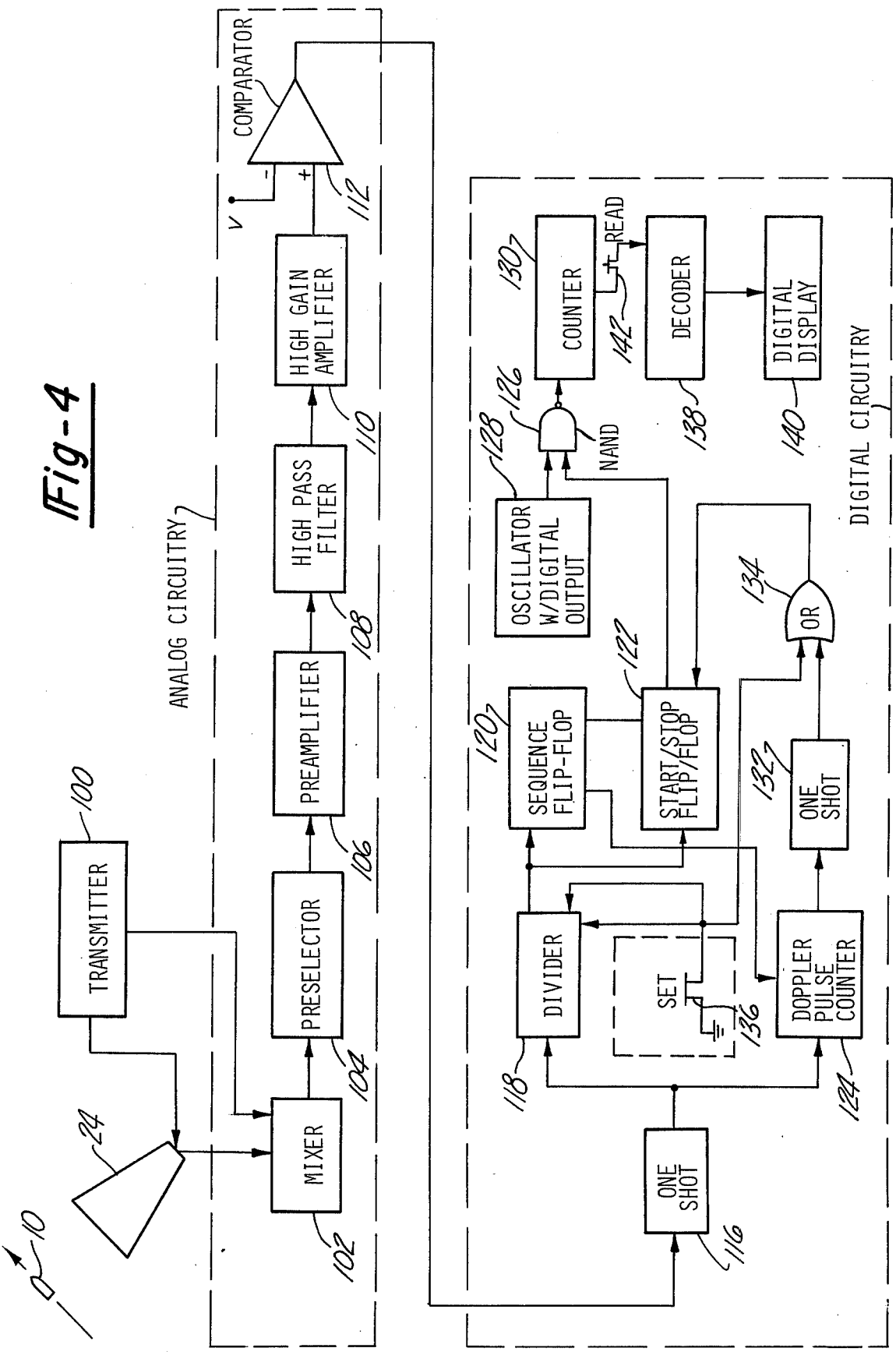
FIG. 4 is a block diagram of the signal processing unit of the chronograph.

The operation of chronograph 20 can best be understood by reference to FIG. 4.

Transmitter 100 generates a radar signal at a known, predetermined frequency $f_1$, preferably 10.525 GHz. The signal at frequency $f_1$ is projected by EM antenna 24 into a radar pattern illuminating a portion of the trajectory of bullet 10.

A portion of the transmitted signal is reflected from bullet 10 as it passes through the radar pattern. The reflected signal is received by EM antenna 24 at frequency $f_2$ and is input to a mixer 102. The transmitter 100 also inputs a signal at frequency $f_1$ to mixer 102. Mixer 102 heterodynes both its input signals in a conventional manner to produce an output signal at the Doppler frequency, $f_d$, which is proportional to the difference between $f_1$ and $f_2$.

At this stage the noise level can be as high as 100 $\mu$ volt over a broad frequency range, while the heterodyned or Doppler signal is on the order of 10 $\mu$ volt.

The output from mixer 102 is therefore input to a preselector 104 which is a high-pass, low-loss filter intended to rid the signal of low frequency noise. The output of preselector 104 is input to a preamplifier 106 which is a low noise amplifier having a gain of approximately 150.

The signal is then subjected to a second stage of filtering and amplification. The output of preamplifier 106 is input to a high-pass filter 108, which is a multistage filter designed to establish an effective noise level for the signal. The output of high-pass filter 108 is coupled to the input of a high-gain amplifier 110 which has a gain of approximately 1000. After the two-stage filter amplification process, the output of amplifier 110 has a peak noise level of approximately 0.1 volt, and a signal of 0.4 to 2.0 volts.

The output of high-gain amplifier 110 is fed to a comparator 112 which has a positive reference voltage V of 0.2 volt applied to its negative input terminal. When the output of amplifier 110 exceeds reference voltage V, comparator 112 is triggered.

A one-shot pulse generator 116 is provided after comparator 112 to eliminate false triggering of the comparator by noise spikes riding on the Doppler signal. When triggered by comparator 112, one-shot 116 produces a digital pulse having a duration at least as long as one-half the period of the Doppler signal. Each Doppler cycle is therefore represented by a digital pulse from one-shot 116.

In the digital circuitry, the output of one-shot 116 is fed to a divider 118. Divider 118 counts a predetermined number of pulses, nominally in the range of 4 to 16, to allow the bullet 10 to more fully enter the radar pattern before beginning the measuring sequence. This delay gives a higher signal-to-noise ratio. When the requisite number of cycles have passed, divider 118 activates the counting sequence by enabling a sequence flip-flop 120 and a start/stop flip-flop 122 by changing their states.

Sequence flip-flop 120 then enables a Doppler pulse counter 124 whose input is tied to the output of one-shot 116. The purpose of counter 124 is to count a reference number of Doppler pulses nominally 10, over which the velocity of the bullet will be measured.

Simultaneous with the enabling of Doppler pulse counter 124, start/stop flip-flop 122 provides an input signal to one terminal of NAND gate 126. The other terminal of NAND gate 126 receives the output of a stable digital oscillator 128. The output of NAND gate 126 is input to a digital counter 130. The digital counter 130 counts the pulses from the oscillator 128 over the period of the reference number of pulses.

When Doppler pulse counter 124 has counted the reference number of pulses, it outputs a pulse to trigger a one-shot pulse generator 132. The output of one-shot 132 is applied to one input terminal of an OR gate 134. The output of OR gate 134 disables start/stop flip-flop 122 by changing its state. Start/stop flip-flop 122, in turn, stops counter 130 by closing NAND gate 126. At this point the measurement sequence is complete.

By tying together corresponding inputs of start/stop and sequence flip-flops, 122 and 120 respectively, the switching over of start/stop flip-flop 122 simultaneously switches over sequence flip-flop 12. Thus, when the measurement sequence is completed it cannot reoccur until all of the flip-flops and counters are reset by pressing a SET button 136.

Referring again to digital counter 130, the output of that counter is decoded in conventional fashion by a decoder 138. The output of decoder 138 is then fed to a digital display 140 where a read-out is presented. A READ button 142 is provided to activate decoder 138 and display 140 only when needed in order to extend battery life.

The read-out on display 140 is directly proportional to the velocity of bullet 10 in accordance with the relationship heretofore given. Compensation must be made, however, for the cosine of the angle $\theta$ in FIG. 1 between the range axis of the trajectory of bullet 10 and the symmetrical axis of the radar pattern. Since the angular relationship between the trajectory and the radar unit 22 varies as the bullet passes through the radar pattern, the angle $\theta$ is chosen as the average angle for purposes of calculation. This is a sufficiently close approximation because the $\cos \theta$ is nearly linear over a short range of small angles. A particular value of $\theta$ is generated a priori for each popular ammunition type.

Therefore, knowing the frequency of the transmitted radar signal $f_1$, the relationship between the read-out on the chronograph 20 and the Doppler frequency $f_d$, and the predetermined, average angle $\theta$, the velocity of bullet 10 can be calculated. To facilitate determination of muzzle velocity, look-up tables may be generated for each popular ammunition type.

Alternatively, a chronograph embodying the present invention may be modified to incorporate hardware capable of directly displaying the projectile velocity. Such is a design choice that would necessarily add a further level of complexity to the chronograph heretofore described.

The present invention then has been shown to be a chronograph which, with respect to Federal Communications Commission limitations on power levels, provides means to accurately ascertain the muzzle velocity of a projectile while the projectile is in near proximity to the muzzle. The invention presents advantages over prior art devices which measure downrange velocity and extrapolate in reverse to make a calculated estimate of muzzle velocity. The prior art technique is inherently less accurate owing to error factors that influence the projectile velocity between the point of discharge from the muzzle and the downrange measurement.

The invention is adaptable to all types of popular firearms, including rifles, pistols and shotguns. The invention as described in the preceding description of a specific embodiment is intended to be illustrative, and not limiting.

The embodiments of the invention in which an exclusive property or privilege is claimed are defined as follows:

1. A chronograph for measuring the muzzle velocity of a projectile discharged from a firearm and in a portion of the trajectory, comprising:
   electromagnetic wave energy source means at a predetermined frequency, $f_1$;
   electromagnetic wave energy receiver means for receiving electromagnetic wave energy originating from the source means and reflected by the projectile at a frequency, $f_2$;
   an electromagnetic wave antenna coupled to the source means and receiver means for illuminating the trajectory of the projectile with electromagnetic wave energy and receiving such energy as reflected by the projectile,
   the electromagnetic wave antenna having a layer of sonic damping means disposed thereover to lower the resonant mechanical frequency thereof into a range near 0 to 10 Hz;
   a mixer coupled to the source means and receiver means which has an output signal at a frequency $f_d$ proportional to the difference between $f_1$ and $f_2$; and,
   means for processing the mixer output signal to determine the muzzle velocity as a function of the frequency $f_d$.

2. A chronograph as defined in claim 1, wherein the sonic damping means comprises a layer of resilient material disposed over the outer periphery of the antenna.

3. A chronograph as defined in claim 2, wherein the resilient material is silastic rubber.

4. A chronograph as defined in claim 2, wherein the resilient material is foam rubber.

5. A chronograph as defined in claim 2, wherein the resilient material is polyurethane.

6. A chronograph as defined in claim 1, wherein the antenna has a diverging horn shape with a frontal opening, and an electromagnetic lens disposed over the frontal opening.

7. A chronograph as defined in claim 6, wherein the electromagnetic lens is formed of plastic.

8. A chronograph as defined in claim 6, further comprising sight means mechanically coupled to the electromagnetic wave antenna for aiming the electromagnetic wave energy radiated from the antenna.

9. A chronograph as defined in claim 8, wherein the sight means is pivotally adjustable in the horizontal plane.

10. A chronograph as defined in claim 8, further comprising a standard in support of the electromagnetic wave antenna.

11. A chronograph as defined in claim 10, further comprising means for selectively adjusting the vertical position of the standard.

12. A chronograph as defined in claim 10, further comprising a spacer rod for calibrating the lateral position of the electromagnetic wave antenna with respect to the firearm, the spacer rod having means or opposed ends for engaging the firearm and standard, respectively.

13. A chronograph as defined in claim 10, further comprising means for leveling the electromagnetic wave antenna with respect to the firearm.

* * * * *